United States Patent [19]

Wife et al.

[11] Patent Number: 4,925,917

[45] Date of Patent: May 15, 1990

[54] POLYMERIZATION OF OLEFIN/CARBON MONOXIDE WITH CATALYST COMPOSITION COMPRISING HALOGEN DICARBOXYLIC ACID

[75] Inventors: Richard L. Wife; Pui K. Wong, both of Amsterdam, Netherlands

[73] Assignee: Shell Oil Company, Houston, Tex.

[21] Appl. No.: 277,839

[22] Filed: Nov. 30, 1988

[30] Foreign Application Priority Data

Dec. 1, 1987 [NL] Netherlands .......................... 8702879

[51] Int. Cl.$^5$ .............................................. C08G 67/02
[52] U.S. Cl. ..................................... 528/392; 502/162
[58] Field of Search .......................................... 528/392

[56] References Cited

U.S. PATENT DOCUMENTS 4,818,810  4/1989  Drent .................................. 528/392

FOREIGN PATENT DOCUMENTS 0121965  10/1984  European Pat. Off. .
0181014   5/1986  European Pat. Off. .
0222454   5/1987  European Pat. Off. .
0251373   1/1988  European Pat. Off. .

Primary Examiner—Harold D. Anderson
Attorney, Agent, or Firm—Dean F. Vance

[57] ABSTRACT

Contacting carbon monoxide and at least one $\alpha$-olefin in the presence of a catalyst composition containing a palladium compound, a halogen dicarboxylic acid, and a bidentate phosphorus ligand results in the production of polyketone polymers with high molecular weights at high polymerization rates.

10 Claims, No Drawings

POLYMERIZATION OF OLEFIN/CARBON MONOXIDE WITH CATALYST COMPOSITION COMPRISING HALOGEN DICARBOXYLIC ACID

FIELD OF THE INVENTION

The invention relates to novel compositions which can suitably be used as catalysts in the preparation of polymers of carbon monoxide with one or more α-olefins.

BACKGROUND OF THE INVENTION

Linear polymers of carbon monoxide with one or more α-olefins, in which the polymer component derived from carbon monoxide alternates with the other polymer components in units of the formula —(-CO)—A—, wherein A represents a polymer component derived from the α-olefin, can be prepared by using a catalyst composition on the basis of
  (a) a palladium compound,
  (b) a halogen monocarboxylic acid, and
  (c) a phosphorus bidentate ligand of the general formula $R_1R_2P\text{-}R\text{-}PR_3R_4$, wherein $R_1$, $R_2$, $R_3$ and $R_4$ are similar or different aryl groups which may optionally be substituted with polar groups and R is a bivalent organic bridging group containing at least two carbon atoms in the bridge.

Processes for the production of such polymers are illustrated by published European patent application Nos. 0,121,965; 0,181,014; and 0,222,454, which are incorporated by reference herein.

In the polymer preparation mentioned hereinbefore, both reaction rates and molecular weights of the polymers formed play an important role. On the one hand, it is desirable that the reaction rates achieved in the polymer preparation be as high as possible and on the other hand, the polymers will be more valuable with a view to their possible uses as their molecular weights are higher. Both reaction rates and molecular weights can be influenced by the temperature applied during polymerization. Unfortunately, the effects which the temperature has on the reaction rates and on the molecular weights are opposed to one another, in that, at otherwise similar reaction conditions, an increase in reaction temperature leads to increased reaction rates but decreased molecular weights of the polymers obtained. In actual practice, the trend is to conduct the polymerization at such a temperature that the polymers obtained have molecular weights which are sufficiently high for their intended uses and accept the reaction rates that go with that temperature.

In published European Patent No. 0,251,373 it was disclosed that high polyketone molecular weights could be produced at faster polymerization rates than known in the art by the combination of an increase in polymerization temperature and the use of specific bidentate phosphorus ligands.

In an investigation carried out by the Applicant into the above-mentioned catalyst compositions, it was recently found that their performance is greatly influenced by the amount of halogen monocarboxylic acid present in the catalyst composition. It was found that according as the concentrations of halogen monocarboxylic acid employed in the catalyst compositions are higher, the reaction rates that can be attained at one and the same reaction temperature are higher, and that the polymers obtained have higher molecular weights. This influence of the concentration of halogen monocarboxylic acid on reaction rates and on the molecular weights of the polymers is felt over a wide range of concentrations and it attains its maximum value at a halogen monocarboxylic acid concentration in the catalyst composition of about 20 mol per gram atom of palladium. Above this level of concentration, a further increase of the halogen monocarboxylic acid concentration will not lead to any further significant rise in reaction rates or molecular weights. In view of the favorable effect which a high halogen monocarboxylic acid concentration has both on the reaction rates and on the molecular weights of the polymers obtained, it has thus far been common practice in the preparation of the present polymers to employ a catalyst composition containing about 20 mol of halogen monocarboxylic acid per gram atom of palladium. Although from the stand point of process cost there can hardly be any objection to the application of a high halogen monocarboxylic acid concentration in the catalyst composition, since extremely small quantities of catalyst composition are sufficient for the preparation of the present polymers, the use of a catalyst composition with a high halogen monocarboxylic acid concentration involves another drawback. This drawback is connected with the fact that in the present polymer preparation a considerable portion of the catalyst composition used remains behind in the polymers. A relatively high halogen monocarboxylic acid concentration in the polymers can have an adverse effect on the stability of the polymers. This may lead to such problems as discoloring and decomposition during the working up in molten state of the generally high-melting polymers. It is true that the halogen monocarboxylic acid concentration in the polymers can be reduced by subjecting them to one or more washing treatments, but when practiced on a technical scale these will naturally involve considerable additional expenses.

SUMMARY OF THE INVENTION

An investigation carried out by the Applicant into possible reduction of the acid concentration in catalyst compositions for polymerizing linear, alternating polyketones has now surprisingly led to the finding that increased polymerization rates and molecular weights can be achieved without increasing the polymerization temperature by using an improved catalyst composition that replaces the halogen monocarboxylic acid used in the catalyst composition as component (b) by a halogen dicarboxylic acid. It has been found that the quantity of halogen dicarboxylic acid required for that purpose is much smaller than the molar quantity that might possibly be expected on account of the presence of two carboxyl groups in the halogen dicarboxylic acids.

The present invention therefore includes novel catalyst compositions comprising:
  (a) a palladium compound,
  (b) a halogen dicarboxylic acid, and
  (c) a phosphorus bidentate ligand of the general formula $R_1R_2P\text{-}R\text{-}PR_3R_4$, wherein $R_1$, $R_2$, $R_3$ and $R_4$ are similar or different aryl groups which may optionally be substituted with polar groups and R is a bivalent organic bridging group containing at least two carbon atoms in the bridge.

The present invention further includes the use of these catalyst compositions in the preparation of polymers of carbon monoxide with one or more α-olefins as well as to the polymers thus prepared and shaped objects consisting at least partly of these polymers.

DESCRIPTION OF THE INVENTION

The present invention includes novel catalyst compositions for polymerizing carbon monoxide and α-olefins, the catalyst composition comprising:

(a) a palladium compound,
(b) a halogen dicarboxylic acid, and
(c) a phosphorus bidentate ligand of the general formula $R_1R_2P-R-PR_3R_4$, wherein $R_1$, $R_2$, $R_3$ and $R_4$ are similar or different aryl groups which may optionally be substituted with polar groups and R is a bivalent organic bridging group containing at least two carbon atoms in the bridge.

The palladium compound used in the catalyst compositions as component (a) is preferably a palladium salt of a carboxylic acid and in particular a palladium acetate.

The component (b) used in the catalyst compositions is preferably a fluorodicarboxylic acid. Examples of suitable fluorodicarboxylic acids are difluoromalonic acid, tetrafluorosuccinic acid, hexafluoroglutaric acid, and octafluoroadipic acid. Preference is given to tetrafluorosuccinic acid and hexafluoroglutaric acid. Component (b) is preferably present in the catalyst compositions in a quantity of from 0.5 to 2 and in particular of from 0.75 to 1.5 mol per gram atom of palladium.

In the bisphosphines of the general formula $R_1R_2P-R-PR_3R_4$ which can suitably be used as component (c) in the catalyst compositions of the invention, the groups $R_1$, $R_2$, $R_3$ and $R_4$ are preferably phenyl groups which may optionally be substituted with polar groups. As polar substituents which may be present in the groups $R_1$, $R_2$, $R_3$ and $R_4$ may be mentioned inter alia alkoxy groups, such as methoxy groups, dialkyl-amino groups, such as dimethyl-amino groups, and thioalkyl groups, such as thiomethyl groups. In the catalyst compositions of the invention, bisphosphines in which the groups $R_1$, $R_2$, $R_3$ and $R_4$ each contain one or more polar groups are used by preference. Further, it is preferred to use such bisphosphines in which at least one of these polar substituents per aryl group occupies a position ortho to the phosphorus atom to which the aryl groups concerned is bound. Finally, preference is given to bisphosphines in which the groups $R_1$, $R_2$, $R_3$ and $R_4$ are similar to one another as well as to bisphosphines in which the polar substituents that may be present in the groups $R_1$, $R_2$, $R_3$ and $R_4$ are alkoxy groups and in particular methoxy groups.

As for the bridging group R which occurs in the bisphosphines, preference is given to bridging groups containing three atoms in the bridge at least two of which are carbon atoms. Examples of suitable bridging groups R are the —$CH_2$—$CH_2$—$CH_2$-group, the —$CH_2$—$C(CH_3)_2$—$CH_2$-group and the —$CH_2$—$Si(CH_3)_2$—$CH_2$-group. Bisphosphines that can be very suitably used as components (c) in the catalyst compositions are
1,3-bis[di(2-methoxyphenyl)phosphino]propane,
1,3-bis[di(2,4-dimethoxyphenyl)phosphino]propane,
1,3-bis[di(2,6-dimethoxyphenyl)phosphino]propane, and
1,3-bis[di(2,4,6-trimethoxyphenyl)phosphino]propane.

Special preference is given to the use of 1,3-bis[di(2-methoxyphenyl)phosphino]propane as component (c). By preference, the bisphosphines are employed in the catalyst compositions in a quantity of from 0.5 to 2 and in particular of from 0.75 to 1.5 mol per gram atom of palladium.

In order to enhance the activities of the catalyst compositions, a 1,4-quinone may be incorporated as a component (d). 1,4-benzoquinones and 1,4-naphthoquinones have proven very suitable for the purpose. Preferably, the amount of 1,4-quinone used is 5–5000 and in particular 10–1000 mol per gram atom of palladium.

The polymerization using the catalyst compositions of the invention is preferably performed by contacting the monomers with a solution of the catalyst composition in a diluent in which the polymers are insoluble or virtually insoluble. Very suitable diluents are lower alcohols, and in particular methanol. The polymerization may be carried out batchwise or continuously.

The quantity of catalyst composition used in the polymer preparation may vary within wide ranges. Per mol of α-olefin to be polymerized, such a quantity of catalyst composition is preferably used as to contain from $10^{-7}$ to $10^{-3}$ and in particular from $10^{-6}$ to $10^{-4}$ gram atom of palladium.

The α-olefins used in the polymerization preferably contain at most 10 carbon atoms per molecule. Examples of suitable α-olefins are ethylene, propylene, 1-butene, 1-hexene, and 1-octene.

The catalyst compositions of the invention are particularly important for their use in the preparation of alternating copolymers of carbon monoxide with ethylene and in the preparation of alternating terpolymers of carbon monoxide with ethylene and another α-olefin, in particular propylene.

The preparation of the polymers is preferably carried out at an overall pressure of from 20 to 150 bar and a temperature of from 40° to 120° C., and in particular at an overall pressure of from 30 to 100 bar and a temperature of from 50° to 100° C. The olefin/carbon monoxide partial pressure ratio applied in the polymerization is preferably chosen to lie between 0.5 and 5, and in particular between 0.6 and 3.5.

As a rule, the polymers prepared by the invention will exhibit higher intrinsic viscosities according as their molecular weights are higher. For the determination of the intrinsic viscosity of a polymer prepared according to the invention, four solutions are prepared by dissolving the polymer in four different concentrations at 60° C. in m-cresol. For each of these solutions, the viscosity is measured in a viscometer at 60° C. relative to m-cresol at 60° C. If $T_o$ represents the outflow time of m-cresol and $T_p$ the outflow time of the polymer solution, the relative viscosity ($\eta_{rel}$) is obtained from $$\eta_{rel} = \frac{T_o}{T_p}.$$

From $\eta_{inh}$ can be calculated the inherent viscosity ($\eta_{inh}$) according to the formula $$\eta_{inh} = \frac{\ln \eta_{rel}}{c},$$

wherein c represents the concentration of the polymer in grams per 100 ml of solution. By plotting graphically the $\eta_{inh}$ found for each of the four polymer solutions against the corresponding concentration (c) and then by extrapolating to c=0, the intrinsic viscosity $[\eta]$ in dl/g is found. Instead of "intrinsic viscosity", this patent application will henceforth use the term recommended by the international Union of Pure and Applied Chemistry, viz. "Limiting Viscosity Number" (LVN).

The invention will now be illustrated with the aid of the following examples.

ILLUSTRATIVE EMBODIMENT 1

A carbon monoxide and ethylene copolymer was prepared as follows. A mechanically stirred autoclave with a volume of 300 ml was charged with 200 ml of methanol. After the contents of the autoclave were brought to 90° C., ethylene and carbon monoxide were introduced in such quantities that the ethylene partial pressure was 33 and the carbon monoxide partial pressure was 22 bar. Subsequently, a catalyst solution was introduced into the autoclave which comprised
23.5 ml methanol,
1.5 ml toluene,
0.005 mmol palladium acetate,
0.005 mmol hexafluoroglutaric acid, and
0.006 mmol 1,3-bis[di(2-methoxyphenl)phosphino]propane.

The pressure inside the autoclave was maintained by addition of a 1:1 carbon monoxide and ethylene mixture. After 2.5 hours, the polymerization was terminated by cooling the reaction mixture to room temperature and releasing the pressure. The copolymer was filtered off, washed with methanol and dried at 70° C.

The yield was 24.7 g of copolymer. The polymerization rate was 18.6 kg copolymer/g palladium/hour. The copolymer had an LVN of 1.0 dl/g.

ILLUSTRATIVE EMBODIMENT 2

A carbon monoxide and ethylene copolymer was prepared substantially in the same way as the copolymer of Illustrative Embodiment 1, except for the following differences
(a) the catalyst solution contained 0.0055 mmol of tetrafluorosuccinic acid instead of 0.005 mmol of hexafluoroglutaric acid, and
(b) the reaction time was 3 hours instead of 2.5 hours.

The yield was 23.6 g of copolymer. The polymerization rate was 14.8 kg copolymer/g palladium/hour. The copolymer had an LVN of 0.8 dl/g.

COMPARATIVE EXAMPLE 3

A carbon monoxide and ethylene copolymer was prepared as follows. A mechanically stirred autoclave with a volume of 300 ml was charged with 200 ml of methanol. After the contents of the autoclave were brought to 90° C., ethylene and carbon monoxide were introduced in such quantities that the ethylene partial pressure was 33 and the carbon monoxide partial pressure was 22 bar. Subsequently, a catalyst solution was introduced into the autoclave which comprised
23.5 ml methanol,
1.5 ml toluene,
0.01 mmol palladium acetate,
0.02 mmol trifluoroacetic acid, and
0.01 mmol 1,3-bis[di(2-methoxyphenyl)phosphino]propane.

The pressure inside the autoclave was maintained by addition of a 1:1 carbon monoxide and ethylene mixture. After 3 hours, the polymerization was terminated by cooling the reaction mixture to room temperature and releasing the pressure. The copolymer was filtered off, washed with methanol and dried at 70° C.

The yield was 15.9 g of copolymer. The polymerization rate was 5 kg copolymer/g palladium/hour. The copolymer had an LVN of 0.5 dl/g.

COMPARATIVE EXAMPLE 4

A carbon monoxide and ethylene copolymer was prepared substantially in the same way as the copolymer of Comparative Example 3, except that the catalyst solution comprised 0.04 mmol trifluoroacetic acid.

The yield was 22.3 g of copolymer. The polymerization rate was 7 kg copolymer/g palladium/hour. The copolymer had an LVN of 0.8 dl/g.

COMPARATIVE EXAMPLE 5

A carbon monoxide and ethylene copolymer was prepared substantially in the same way as the copolymer of Comparative Example 3, except for the following differences
(a) a catalyst solution was introduced into the autoclave which comprised
23.5 ml methanol,
1.5 ml toluene,
0.0055 mmol palladium acetate,
0.11 mmol trifluoroacetic acid, and
0.0066 mmol 1,3-bis[di(2-methoxyphenyl)phosphino]propane, and
(b) the reaction time was 2 hours instead of 2.5 hours.

The yield was 19.8 g of copolymer. The polymerization rate was 17 kg copolymer/g palladium/hour. The copolymer had an LVN of 1.0 dl/g.

COMPARATIVE EXAMPLE 6

A carbon monoxide and ethylene copolymer was prepared substantially in the same way as the copolymer of Comparative Example 5, except that the catalyst solution comprised 0.165 mmol trifluoroacetic acid.

The yield was 17.5 g of copolymer. The polymerization rate was 15.0 kg copolymer/g palladium/hour. The copolymer had an LVN of 0.9 dl/g.

COMPARATIVE EXAMPLE 7

A carbon monoxide and ethylene copolymer was prepared substantially in the same way as the copolymer of Comparative Example 5, except that the catalyst solution comprised 0.33 mmol trifluoroacetic acid.

The yield was 21.0 g of copolymer. The polymerization rate was 16.0 kg copolymer/g palladium/hour. The copolymer had an LVN of 1.0 dl/g.

COMPARATIVE EXAMPLE 8

A carbon monoxide/ethene/propene terpolymer was prepared prepared as follows. A mechanically stirred autoclave with a volume of 300 ml was charged with 125 ml of methanol. After the contents of the autoclave were brought to 65° C., ethylene, propylene, and carbon monoxide were introduced in such quantities that the ethylene partial pressure was 21 bar, the propylene partial pressure was 15 bar, and the carbon monoxide partial pressure was 20 bar. Subsequently, a catalyst solution was introduced into the autoclave which comprised
25 ml methanol,
0.01 mmol palladium acetate,
0.02 mmol trifluoroacetic acid, and
0.012 mmol 1,3-bis(diphenylphosphino)propane.

The pressure inside the autoclave was maintained by addition of a 1:1 carbon monoxide and ethylene mixture. After 10 hours, the polymerization was terminated by cooling the reaction mixture to room temperature and releasing the pressure. The terpolymer was filtered off, washed with methanol and dried at 70° C.

The yield was 10 g of terpolymer. The polymerization rate was 0.9 kg terpolymer/g palladium/hour. The terpolymer had an LVN of 0.45 dl/g.

COMPARATIVE EXAMPLE 9

A carbon monoxide, ethylene, and propylene terpolymer was prepared substantially in the same way as the terpolymer of Comparative Example 8, the difference being that the catalyst solution comprised 0.20 mmol of trifluoroacetic acid.

The yield was 18 g of terpolymer. The polymerization rate was 1.7 kg terpolymer/g palladium/hour. The terpolymer had an LVN of 0.57 dl/g.

Of Examples 1-9, Illustrative Embodiments 1 and 2 are examples in accordance with the invention. In these examples, carbon monoxide and ethylene copolymers were prepared by using catalyst compositions containing a halogen dicarboxylic acid as component (b).

Comparative Examples 3-9 fall outside the scope of the invention and have been included in the patent application for comparison. In these examples, the carbon monoxide and ethylene copolymers and carbon monoxide, ethylene, and propylene terpolymers were prepared by using catalyst compositions containing a halogen monocarboxylic acid as component (b).

With the aid of $^{13}$C-NMR analysis it was established that the carbon monoxide and ethylene copolymers prepared by Examples 1-7 had a linear alternating structure and that therefore they consisted of units of the formula $-(CO)-(C_2H_4)-$. With the aid of $^{13}$C-NMR analysis it was also established that the carbon monoxide, ethylene, and propylene terpolymers prepared by Examples 8 and 9 had a linear structure and that therefore they consisted of units of the formula $-(CO)-(C_2H_4)-$ and units of the formula $-(CO)-(C_3H_6)-$, which units occurred randomly distributed within the terpolymers.

The effect which the halogen monocarboxylic acid concentration in the catalyst composition has on reaction rates and molecular weights is clearly demonstrated by the comparison of the results of Examples 3, 4 and 5, which were carried out using catalyst compositions containing an ortho-polar-substituted bisphosphine as component (c). According as the acid concentration increases from 2 to 4 to 20 mol/gram atom of palladium, the polymerization rate rises from 5 to 7 to 17 kg copolymer/g palladium/hour, and the LVN rises from 0.5 to 0.8 to 1.0 dl/g. A similar phenomenon is seen upon comparison of the results of Examples 8 and 9, which were carried out by using catalyst compositions containing a non-polar-substituted bisphosphine as component (c). When the acid concentration increases from 2 to 20 mol/gram atom palladium, the reaction rate rises from 0.9 to 1.7 kg terpolymer/g palladium/hour and the LVN from 0.45 to 0.57 dl/g.

As can be seen from the comparison of the results of Examples 6 and 7 (carried out using catalyst compositions in which the acid concentrations were 30 and 60 mol/gram atom of palladium, respectively) with those of Example 5 (carried out using a catalyst composition in which the acid concentration was 20 mol/gram atom of palladium), an increase of the acid concentrations to values above 20 mol/gram atom of palladium does not lead to any significant improvement in reaction rates or molecular weights.

The favorable effect which appears when the halogen monocarboxylic acid used in the catalyst composition as component (b) is replaced in accordance with the invention by a halogen dicarboxylic acid is clearly demonstrated by the comparison of the results of Examples 1, 2 and 5. Examples 1 and 2, which were carried out using catalyst compositions containing only 1 mol of halogen dicarboxylic acid/gram atom of palladium, led to reaction rates and molecular weights comparable to those obtained in Example 5, which was carried out using a catalyst composition containing 20 mol of halogen monocarboxylic acid/gram atom of palladium.

we claim:

1. A process for the preparation of alternating polymers of carbon monoxide and α-olefins, the process comprising contacting carbon monoxide and at least one α-olefin in the presence of a catalyst composition that comprises
   (a) a palladium compound,
   (b) a halogen dicarboxylic acid, and
   (c) a phosphorus bidentate ligand of the general formula $R_1R_2P$-R-$PR_3R_4$, wherein $R_1$, $R_2$, $R_3$ and $R_4$ are similar or different aryl groups or polar substituted aryl groups and R is a bivalent organic bridging group containing at least two carbon atoms in the bridge.

2. The process as claimed in claim 1, wherein the monomers are contacted in a diluent that contains the catalyst composition, the resulting polymer being insoluble or virtually insoluble in the diluent.

3. The process as claimed in claim 2, wherein the amount of the catalyst composition used ranges from $10^{-7}$ to $10^{-3}$ gram atom of palladium per mol of the α-olefins.

4. The process as claimed in claim 1, wherein the α-olefins contain at most 10 carbon atoms in the molecule.

5. The process as claimed in claim 4, wherein the α-olefins are selected from ethylene or a mixture of ethylene and another α-olefin.

6. The process as claimed in claim 1, wherein the monomers are contacted at a temperature of from 40° to 120° C., an overall pressure of from 20 to 150 bar and an olefin/carbon monoxide partial pressure ratio of from 0.5 to 5.

7. The process as claimed in claim 6, wherein the monomers are contacted at a temperature of from 50° to 100° C., an overall pressure of from 30 to 100 bar and an olefin/carbon monoxide partial pressure ratio of from 0.6 to 3.5.

8. The process as claimed in claim 1, wherein the halogen dicarboxylic acid is a fluorodicarboxylic acid.

9. The process as claimed in claim 8, wherein the fluorodicarboxylic acid is tetrafluorosuccinic acid or hexafluoroglutaric acid.

10. The process as claimed in claim 1, wherein component (c) is 1,3-bis[di(2-methoxyphenyl)phosphino]propane.

* * * * *